United States Patent [19]

Bourne et al.

[11] Patent Number: 4,693,089
[45] Date of Patent: Sep. 15, 1987

[54] THREE FUNCTION HEAT PUMP SYSTEM

[75] Inventors: Richard C. Bourne, Davis; Martin Fanciullo, Rancho Cordorvia; Willem Bos, Sacramento, all of Calif.

[73] Assignee: Phenix Heat Pump Systems, Inc., Elk Grove, Calif.

[21] Appl. No.: 844,545

[22] Filed: Mar. 27, 1986

[51] Int. Cl.⁴ ............................................. F25B 7/00
[52] U.S. Cl. .................................. 62/79; 62/238.6; 62/238.7
[58] Field of Search ................ 62/238.6, 238.7, 79

[56] References Cited

U.S. PATENT DOCUMENTS

| | | |
|---|---|---|
| 2,221,971 | 11/1940 | Haywood . |
| 2,396,338 | 3/1946 | Newton . |
| 2,529,154 | 11/1950 | Hammond et al. . |
| 2,689,090 | 9/1954 | Wetherbee et al. . |
| 2,693,939 | 11/1954 | Marchant et al. . |
| 4,011,731 | 3/1977 | Meckler . |
| 4,030,312 | 6/1977 | Wallin et al. . |
| 4,171,619 | 10/1979 | Clark . |
| 4,178,989 | 12/1979 | Takeshita et al. . |
| 4,242,872 | 6/1981 | Shaw . |
| 4,242,873 | 1/1981 | Hino . |
| 4,245,476 | 1/1981 | Shaw . |
| 4,246,956 | 1/1981 | Drucker . |
| 4,251,997 | 2/1981 | Newton . |
| 4,256,475 | 3/1981 | Schafer . |
| 4,270,359 | 6/1981 | Hummel . |
| 4,270,518 | 6/1981 | Bourne . |
| 4,302,942 | 12/1981 | Charters et al. . |
| 4,336,692 | 6/1982 | Ecker et al. . |
| 4,392,359 | 7/1983 | Franklin . |
| 4,399,664 | 8/1983 | Derosier ........................... 62/238.7 |
| 4,493,193 | 1/1985 | Fisher ........................... 62/238.7 X |
| 4,514,990 | 5/1985 | Sulkowski ........................... 62/238.7 |
| 4,598,557 | 7/1986 | Robinson et al. ............... 62/238.7 X |
| 4,645,908 | 2/1987 | Jones ...................................... 219/378 |
| 4,646,538 | 3/1987 | Blackshaw et al. ................ 62/238.7 |

OTHER PUBLICATIONS

Evaluation of a Radiatively Assisted Heat Pump for Heating and Cooling, John J. Carroll and Richard C. Bourne.
Membrane-Lined Thermal Storage Systems, Richard C. Bourne, Solar-Electric Heat Pump Home, Richard C. Bourne.

Primary Examiner—Lloyd L. King
Attorney, Agent, or Firm—Parkhurst & Oliff

[57] ABSTRACT

The invention relates to a three-function heat pump system which provides space heating, space cooling and hot water. The system permits hot water production all year long without operation of the system in the heating or cooling modes. To this end, the system employs a large storage tank and a relatively smaller hot water tank. A heat exchanger within the hot water tank is sized sufficiently to permit the hot water heat exchanger to function as a system condenser, thereby permitting the refrigerant to bypass the large storage tank. The system is packaged in a compact unit in which the compressor of the system is located within an insulated container with the domestic hot water tank. The crankcase of the compressor therefore remains warm to prevent migration of the refrigerant to the compressor during off seasons. The location of the compressor adjacent to the hot water tank eliminates the need for less energy efficient resistance crankcase heaters.

13 Claims, 3 Drawing Figures

THREE FUNCTION HEAT PUMP SYSTEM

BACKGROUND AND SUMMARY OF THE INVENTION

The invention relates to a three function heat pump system. More particularly, the invention relates to a three function heat pump system for space heating, cooling and water heating, the system providing water heating all year long regardless of the system operating in the heating or cooling mode.

Systems for space heating and cooling are known. For example, U.S. Pat. Nos. 4,242,873; 4,270,518; 4,030,312; 4,242,872; 4,392,359; 4,302,942; 4,256,475; 4,246,956; 4,336,692; 4,279,359 and 4,011,731 disclose various systems for heat pumps which may provide for heating and cooling.

Nevertheless, the prior art systems fail to provide a system which is capable of hot water production all year long. The known systems only produce hot water when the system is operating in the heating or cooling mode using a desuperheater.

In addition, the components of the prior art systems are not arranged for efficient operation. For example, conventional systems have resistance crankcase heaters which operate continuously to warm the compressor so that liquid refrigerant does not migrate into the compressor during off-cycles. Crankcase heater operation has a negative energy impact, particularly in mild climates. Interconnection and assembly of the components of the prior art systems are also cumbersome and time consuming for installation in the field.

It is an object of the invention to obviate the disadvantages of the known systems by providing a three function heat pump system which generates domestic hot water all year long without requiring operation in a heating or cooling mode.

Another object of the invention is to provide a three function heat pump system which produces domestic hot water all year long by employing dual condensers that are connected in series or one at a time.

It is another object of the invention to provide a three function heat pump system having an arrangement of components which increases energy efficiency by eliminating the need for crankcase heaters.

It is a further object of the invention to provide a three function heat pump system which packages the components efficiently to conserve space and eliminate connections thereby facilitating rapid installation in the field.

An additional object of the invention is to provide a three function heat pump system which employs storage to facilitate heat pump operation under the most favorable available outdoor weather conditions.

These and other objects, advantages and features are provided by the three function heat pump system in accordance with the invention. The system includes a compressor for compressing the refrigerant into a high pressure, high temperature refrigerant. The refrigerant flows within a reversible flow conduit which provides series communication between a first heat exchanger located within a first reservoir and an external environment heat exchanger. A throttle means is located between the first heat exchanger and the external environment heat exchanger to reduce the pressure of the refrigerant. A reversing valve directs the refrigerant flow from the compressor through a second conduit to the reversible flow conduit, and selectively determines the direction of flow in the reversible flow conduit in response to a desired heating or cooling mode. In the heating mode, the reversing valve directs refrigerant flow in a first direction to the first heat exchanger to condense the refrigerant and transfer heat to a medium within a first storage reservoir prior to directing the condensed refrigerant through the throttle means to the external environment heat exchanger to evaporate the refrigerant. In the cooling mode, the reversing valve directs the refrigerant flow in a second opposite direction, first through the external environment heat exchanger to condense the refrigerant and then to the first heat exchanger to evaporate the refrigerant and absorb heat from the medium within the first reservoir.

The system provides hot water production irrespective of the heating and cooling modes by providing a second heat exchanger in a second hot water reservoir located between the compressor and the reversing valve. In addition, a bypass valve is provided for selectively bypassing the first heat exchanger. Accordingly, hot water is produced regardless of the heating and cooling modes by directing the refrigerant flow through the second heat exchanger to condense the refrigerant and then either directing the refrigerant to the first heat exchanger, or bypassing the first heat exchanger for direct flow to the external environment heat exchanger. With this arrangement, the second heat exchanger functions as a condenser for the system when the first heat exchanger is bypassed.

BRIEF DESCRIPTION OF THE DRAWINGS

The invention will be described in detail hereinafter with reference to the following figures in which like elements bear like reference numerals, and wherein.

DETAILED DESCRIPTION OF THE PREFERRED EMBODIMENTS

The three function heat pump concept employs reversible heat pump technology to provide space heating, space cooling and year-long hot water heating from a single system. The three function heat pump system ("TFOHP system") described herein is designed primarily for residential applications. However, those skilled in the art may adapt the system for other applications without departing from the spirit and scope of the invention as defined in the appended claims.

By way of a non-limiting summary, the three function heat pump system in accordance with the presently claimed invention includes two thermal storage tanks which allow a compressor to operate at more favorable times than it would in direct response to thermal loads. The first tank is a relatively large tank for space conditioning (hereinafter "the space conditioning tank"), and the second tank is relatively smaller than the first tank for domestic water heating (hereinafter "the domestic water tank"). Energy can be withdrawn from the tanks on demand without requiring immediate compressor operation. The compressor is operated to store energy within the tanks to the greatest extent possible, at times when operation of the compressor is less expensive (i.e., off-peak times), or more efficient (i.e. favorable weather).

During winter, the compressor operates to extract heat from an outdoor heat exchanger, and adds the heat extracted and the heat of compression to the two storage tanks. Under normal conditions, hot gas from the compressor will deliver heat to the domestic water tank (the second tank) and then to the space conditioning tank (the first tank). However, if the domestic water tank temperature is too low, the refrigerant will bypass the space conditioning tank and deliver all of its heat to the domestic water heating tank. If the domestic water heating tank is at its upper temperature limit, the hot gas will bypass the domestic water tank and deliver all of its heat to the space conditioning tank.

During summer, the refrigerant flow direction is reversed. Heat is extracted from the large tank to produce either chilled water or ice, and is rejected to the domestic water tank and the outdoor heat exchanger in series. If the domestic water tank temperature is too low, the system can reverse itself to extract heat from the outdoor heat exchanger and supply it to the domestic water tank, bypassing the large tank.

The winter and summer operating modes allow domestic water to be heated by the heat pump even when there are no space heating or cooling loads. To do so, an aspect of the invention is sizing of the domestic water tank heat exchanger large enough to function as a full condenser, thereby permitting bypass of the larger space conditioning tank. In addition, with appropriate controls (e.g., time clocks and thermostatic functions), the compressor may be programmed to operate when the weather and utility rates are most favorable. That is, the compressor may be programmed to operate at night in summary when utility rates are often lower and on whatever winter "off peak schedule" is available from the local electric utility. The system thus stores heating or cooling energy for use on demand.

It is noted that space heating and cooling are accomplished by pumping water from the large storage tank through a connection to a heat distribution system within the building or internal environment. The heat distribution system may include a heat exchange coil, a blower, and duct system to circulate the heated or cooled air, or other available hydronic heating/cooling components. The components of the heat pump system are preferably provided in a compact unit, thereby minimizing the connections between the unit and the heat distribution system, as well as facilitating rapid installation in the field.

I. The Embodiment of FIG. 1

Figure 1:
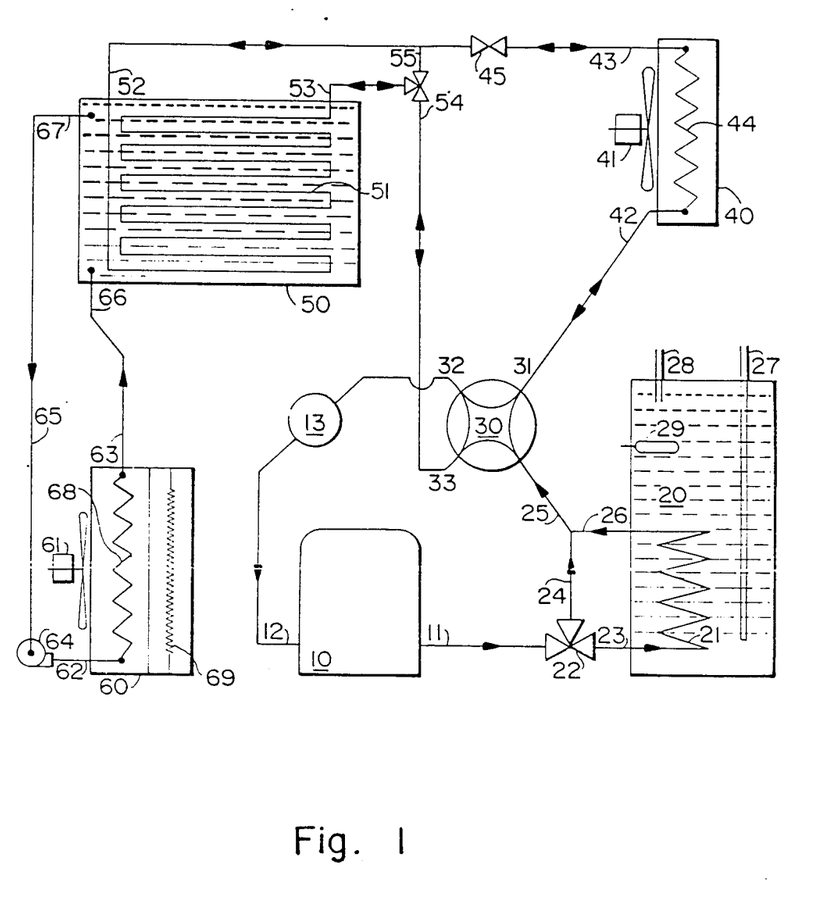
FIG. 1 is a schematic diagram of the three function heat pump system in accordance with the present invention.

With reference to FIG. 1 illustrating a simplified schematic of the three function heat pump system, the system includes a compressor 10 which may be driven by any means, but preferably by an electric motor. The compressor operates on a refrigerant capable of changing its phase between liquid and gaseous states. Several commercially available refrigerants are suitable, but Freon 22 is the preferred refrigerant. The compressor includes an inlet line 12 through which low pressure gas is introduced into the compressor, and an outlet line 11 through which superheated high pressure gas exists from the compressor.

The hot gas in the outlet line 11 is directed towards a domestic water tank 20. The tank 20 is preferably insulated and includes a cold water input line 27 and a hot water exit line 28 which directs heated water toward the building for use. Preferably, the outlet for the cold water input line 27 is located near the bottom of the tank 20, while the inlet for the hot water exit line is located near the top of the tank 20.

A domestic water bypass valve 22 is located between the outlet line 11 and an entry line 23 for a heat exchanger 21 immersed within the tank 20. If the domestic water tank is below its maximum temperature, as measured by system controllers and sensors, the domestic water bypass valve 22 directs hot gas from the outlet line 11 through the entry line 23 into the heat exchanger 21 to heat the water in the domestic water tank 20. When the domestic water tank 20 reaches it maximum temperature, the domestic water bypass valve 22 directs the hot gas through a bypass line 24 to bypass the heat exchanger 21 and the domestic water tank 20. Alternatively, a two way valve in line 24 may replace bypass valve 22. The two-way valve is opened to minimize subsequent temperature increases of the domestic water tank 20.

Heat exchanger 21 is preferably a helical coil located within the domestic water tank 20. As the hot gas from the compressor 10 circulates though the coils of the heat exchanger, it heats the water in the tank 20 and begins to condense by the time the gas exits from the heat exchanger 21 and the tank 20 through an outlet line 26. The outlet line 26 and the bypass line 24 communicate with a common conduit 25 for directing the refrigerant away from the domestic water tank 20 either by bypassing the tank 20 through bypass 24 or upon exiting the heat exchanger 21 through outlet line 24.

While the domestic water heat exchanger 21 is shown as a "free convection" type heat exchanger immersed in the tank 20, other types of heat exchangers are available. For example, an "external type" of heat exchanger may be provided in which water from the tank 20 is driven through a first tube surrounded by a second tube containing the hot gas from the compressor. In operation, the hot gas is forced by the compressor in one direction and water from the domestic water tank is forced by a water pump in the opposite direction, the heated water being returned to the domestic water tank. With this arrangement, the bypass valve 22 may be eliminated, since when the temperature of the domestic water tank reaches its maximum temperature, the water pump may be deactivated.

If the heat delivered by the heat exchanger 21 to the water in the tank 20 is insufficient for domestic needs, the tank 20 may be provided with an auxiliary heating mechanism to supply the necessary heat. For example, resistance heating elements 29 may be provided in the tank to supplement the heat provided by the heat exchanger 21.

From the domestic water heat exchanger 21 or the bypass line 24, the hot gas enters a reversing valve 30 in communication with the common line 25. The reversing valve 30 includes an outlet line 32 and two selective conduits 31, 33. The reversing valve 30 establishes communication between the common line 25 and one of the selective conduits 31, 33 depending upon the seasonal setting of the system, e.g., heating mode or cooling mode, or upon hot water needs. The flow within the selective conduits 31, 33 is reversible so that moderate temperature gas returns to the reversing valve 30 through either conduit 31 or 33 and leaves the reversing valve through outlet line 32. The outlet line 32 directs the moderate temperature gas through an accumulator 13 before reentering the compressor 10 via inlet line 12 for recirculation within the system.

The setting of the reversing valve 30 determines whether the system operates in a heating or cooling mode. In a heating mode, the hot gas initially proceeds through the first selective conduit 33 to the larger space conditioning tank 50 (the first tank) which acts as the system condenser for the heating mode. In the large tank 50, the gas fully condenses to a liquid thus heating the medium, usually water, within the space conditioning tank 50 before passing freely through a line restriction or throttle 45 leading to an outdoor heat exchanger 40. The outdoor heat exchanger 40 functions a a system evaporator in the heating mode for extracting heat from the outdoor environment. The heated refrigerant is directed back to the reversing valve 30 through the second selective conduit 31. In the cooling mode, the flow is reversed so that the hot gas proceeds first to the outdoor heat exchanger 40 through the first selective conduit 31. The hot gas condenses in the heat exchanger 40 to give up heat. The cooled gas then proceeds through the throttle 45 to the large space conditioning tank 50 where it evaporates to extract heat from the medium in the large tank, thereby chilling and/or freezing the medium. The heating and cooling modes are described in detail herein.

A. Heating Mode

In the heating mode, the hot gas from the compressor passes to the reversing valve 30 either thorugh the domestic water heat exchanger 21 to heat the domestic water or through the domestic water tank bypass 24. The reversing valve is set on the heating mode so that the hot gas passes through the first selective conduit 33 and enters a storage tank bypass valve 54. The bypass valve 54 has two outlets: a tank heating outlet 53 and a bypass outlet 55. If space heating is desired, the hot gas leaves the bypass valve 54 through the heating outlet 53 and enters a conditioning tank heat exchanger 51 located within the large sapce conditioning tank 50. If hot water is desired without space conditioning, the hot gas enters the bypass outlet 55 to bypass the tank 50. The bypass outlet 55 is a one-way conduit which only permits flow away from the bypass valve 54.

In the space heating mode, the large space conditioning tank 50 functions as condenser. The hot gas refrigerant enters the conditioning tank heat exchanger 51 through the line 53 and passes through numerous parallel circuits of the exchanger 51. After fully condensing to a pressurized liquid state, the refrigerant leaves the heat exchanger through a passage 52 which directs the liquid through the throttle 45 to cause a substantial drop in the pressure of the liquid. The throttle 45 may be a capillary tube or a pair of thermal expansion valves/-check valve sets, either of which will allow reversible flow.

The pressure drop caused by the throttle 45 results in a substantial drop in temperature, thereby creating a cold liquid. The cold liquid is directed into an outdoor heat exchanger 40 through an inlet line 43. The outdoor heat exchanger 40 functions as an evaporator in the heating mode and may be a fan coil in which a fan 41 pushes outdoor air through an array of fin passages or tubing 44 to extract heat from the outdoor air. The outdoor heat exchanger 40 may alternatively be one or more large fin plates designed to capture solar energy for transfer to the evaporating refrigerant. Moreover, the outdoor heat exchanger may combine the fin coil with the plate. The plate may be hingedly connected to the outdoor heat exchanger so that it is open in winter to increase solar energy input, but closed in the summer to reflect solar energy and reduce heat tank gains.

In the outdoor heat exchanger 40, the cold liquid expands and vaporizes as it absorbs heat from the outdoor environment while flowing through the heat exchange passages 44. A moderate temperature gas (slightly superheated) leaves the outdoor heat exchanger 40 through an outlet line 42 for return to the reversing valve 30 through the second selective conduit 31. Upon entering the reversing valve 30 through the second selective conduit 31, the moderate temperature gas is directed through the outlet line 32 to the accumulator 13 for eventual recycling by the compressor 10.

If domestic water heating is desired with space heating, the gas from the compressor passes first through the domestic water heat exchanger 21 and then through the bypass valve 54 to the large conditioning tank heat exchanger 51 for space heating. After leaving the domestic water heat exchanger 21, the hot gas is typically saturated. The gas is fully condensed upon exiting the conditioning tank heat exchanger 51. When domestic water heating is unnecessary, the gas from the compressor may bypass the domestic water heat exchanger 21 via bypass valve 22 and proceed directly to the space conditioning tank. If domestic water heating is desired without space heating, the hot gas can circulate through the domestic water heat exchanger 21 and bypass the space conditioning tank 50 via bypass passage 55 before proceeding to the outdoor heat exchanger 40. The domestic water heat exchanger is sized large enough to act as a full system condenser under these circumstances.

B. Cooling Mode

In the cooling mode, the flow of refrigerant is reversed. Hot gasses from the compressor may circulate through the domestic water heat exchanger 21 to provide hot water or proceed directly to the reversing valve 30 depending on the temperature of the water in the domestic water tank. The hot refrigerant leaves the reversing valve 30 through the second selective conduit 31 and condenses in the outdoor heat exchanger 40. The liquid refrigerant then passes through the throttle before entering the space conditioning tank 50 through the passage 52. The low pressure liquid expands and evaporates in the space conditioning tank heat exchanger 51 to cool the medium in the tank 50 before exiting through the outlet 53. The evaporating refrigerant may either chill the medium or freeze it, or both, depending on the system design. After leaving the large tank 50, the slightly superheated gas returns to enter the reversing valve 30 via the first selective conduit 33. The reversing valve 30 directs the refrigerant through the outlet line 32 to the accumulator 13 for eventual recirculation by the compressor 10.

It is noted that the flow of refrigerant in the cooling mode cannot bypass the large tank 50 because the tank 50 is required as the evaporator in the cooling mode. Thus, flow from the outdoor heat exchanger cannot enter the bypass outlet 55, but must flow into the passage 52 and through the storage tank heat exchanger 51 in the tank 50.

If domestic hot water heating is required with space cooling, the hot gas proceeds through the domestic tank heat exchanger 21 before flowing to the outdoor heat exchanger 40. When hot water is not necessary, the hot gas bypasses the domestic tank and proceeds directly to the outdoor heat exchanger 40. If cooling is not required but hot water is desired, the system permits the refrigerant to flow through the domestic tank heat exchanger 21 before entering the first selective conduit 33 to the bypass valve 54 for bypassing the space conditioning tank 50 via the outlet 55. In this instance, the outdoor heat exchanger 40 is the evaporator and the domestic water heat exchanger 21 is the condenser.

The space conditioning tank 50 may be either cylindrical or rectangular and preferably has enclosing surfaces which are insulated. The size of the tank and the design of the heat exchanger 51 depend on whether the tank storage medium will change its phase or remain liquid through its operating range. If a phase change design is used, then the tank size may be reduced and the heat exchanger 51 will be provided with numerous small tubes uniformly spaced within the tank so that more than half of the tank medium can be frozen around the tubes.

In a preferred design, the tank 50 includes approximately 100 gallons per ton (12,000 BTUs per hour) of nominal compressor capacity and is designed to freeze on the heat exchanger 51 during the cooling season. Accordingly, the exchanger 51 comprises approximately 12 parallel circuits each approximately 100 feet long of 5/16 inch nominal copper refrigeration tubing. The tubes are spaced approximately 2.5 inches apart throughout the interior of the tank.

C. Distribution System for Space Heating and Cooling of the Internal Environment Space heating and cooling are accomplished using a distribution system that preferably includes an indoor heat exchanger 60 which transfers heat principally by radiation, natural convection, or forced convection. Multiple indoor heat exchangers may be used as desired to provide for zoned control. In the preferred embodiment illustrated in FIG. 1, the tank medium is water and a pump 64 draws water from the top of the space conditioning tank 50 via an outlet port 67 and directs it toward the interior space through line 65. The line 65 delivers the tank water into an array of finned tubing 68. Indoor air is pushed across the finned tube array 68 by a blower 61. In the winter, hot water from the tank 50 thus heats the indoor air. In the summer, the cold water from the tank 50 cools the indoor air. Resistance heat strips 69 are provided in the event additional heat must be applied to the indoor air when the tank water is not able to satisfy the space heating load. The indoor heat exchanger 60 may be provided with a condensate drain to drain away moisture which condenses on the cold finned tubes in the cooling season.

Since the space conditioning tank 50 stores hot water in winter and cold water or ice in the summer, there will be "change-over" times when it will not be capable of satisfying a heating or cooling mode depending on the outdoor temperature. Resistance heat strips 69 allow for indoor comfort to be maintained during the seasonal change-over. The tank 50 is converted to its cold condition early enough in the spring and back to the hot condition late enough in the fall to satisfy unseasonal cooling loads. However, at these times, the resistance strips may be used alone if heating loads develop.

D. Domestic Hot Water Heating

As noted above, the compressor 10 directs hot gas to the bypass valve 22 which selectively permits heating of the water within the domestic hot water heating tank 20. After heating the domestic hot water tank 20 or being bypassed by the bypass valve 22, the refrigerant is directed towards the reversing valve 30.

When the domestic water tank 20 requires heat and the space conditioning tank 50 requires neither heating nor cooling (at any time of the year), the system can still operate to heat domestic water with the outdoor heat exchanger 40 being used as an evaporator and the domestic water heat exchanger 21 used as a condenser. This operation has been previously described in that the hot gas exits via the first selective conduit 33 in the reversing valve 30 and passes to the valve 54 which is actuated to bypass the large space conditioning tank 50. After bypassing the space conditioning tank 50, the refrigerant is directed through the line restriction 45 and into the outdoor heat exchanger 40 which acts as the evaporator. The domestic water heat exchanger 21 acts as the system condenser, thereby permitting the bypassing of the large storage tank.

As evident from the above, the system provides two tanks which function as dual condensers that are either connected in series or one at a time. When in series, the refrigerant flow enters the domestic water tank before flowing through the space conditioning tank, with the domestic water heat exchanger functioning as a "desuperheater" and partial condenser. If only one tank is used, the refrigerant flow passes through either the domestic water tank, or the space heating tank, where refrigerant fully condenses in the tank heat exchanger.

D. Component Arrangement and Module Unit

Figure 2:
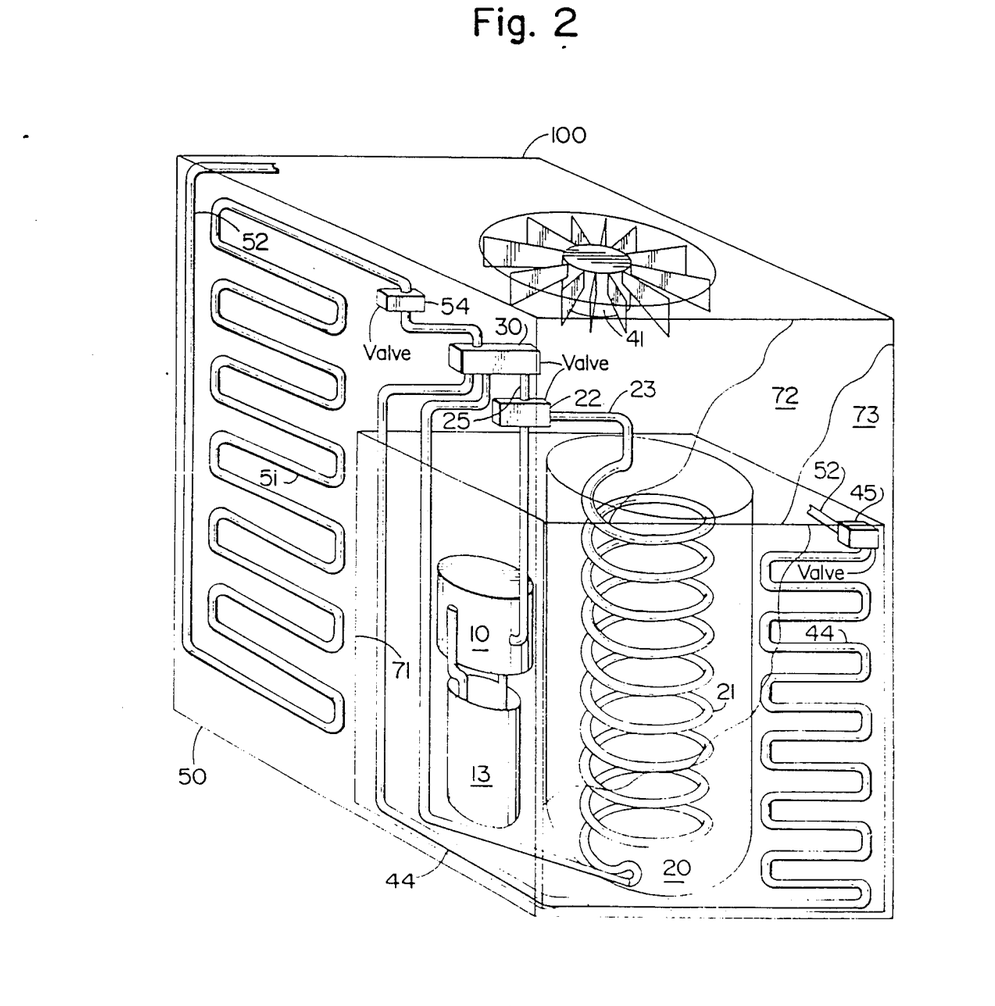
FIG. 2 is a perspective view of a preferred embodiment for the arrangement and configuration of the components of the system.

The arrangement of components within the three function heat pump system provides advantageous energy efficiency. A preferred embodiment of such an arrangement is illustrated in FIG. 2. To eliminate placement and connection of refrigerant lines at the job site, all components except the indoor heat exchanger and its associated controls are grouped together in a single outdoor module or compartment 100. Thus the refrigerant conduits are already connected at the time of installation, leaving only the connection of the liquid conduits which provide communication between the space conditioning tank and the indoor heat exchanger.

For a nominal "four ton" unit, the space conditioning tank 50 preferably contains approximately 400 gallons of water in an insulated container within the compartment 100. The water may be converted largely to ice in the cooling system when the heat exchanger 51 is operated as the system evaporator. The tank portion of the system is preferably a "sandwich panel" construction with a membrane vinyl liner to contain the water. The water tank is approximately 6 feet tall and occupies approximately two-thirds of the total unit volume for a four ton unit.

The domestic water storage tank 20 is relatively smaller than the space conditioning tank 50 and located to one side of the larger tank in a separate insulated enclosure 71. An interior wall may be provided between the insulated enclosure 71 and the tank 50. Preferably, the domestic water storage tank 20 contains approximately 80 gallons of water and is therefore the second largest component in the system. Morever, the domestic water heater is preferably approximately twice the size of the typical residential storage type water heater. This larger capacity of the domestic water heater allows for equal heat energy storage at reduced temperature, thus contributing to the potential for off peak system operation. Moreover, the domestic water storage tank compensates for the tank pump performance penalty at higher condensing temperatures.

The domestic water heat exchanger 21 within the domestic water storage tank 20 is preferably a double wall vented thinned copper helical coil immersed in the pressurized tank 20. The domestic water tank bypass valve 22 is located near the top of the tank 20, preferably on the interior wall. Hot gas enters the heat exchanger 21 at the top of the tank 20 and spirals downward exiting upward through a tube leading to the reversing valve 30 preferably located adjacent the bypass valve 22 on the interior wall.

The location of the compressor 10 is important to efficient full year energy performance. In conventional heat pumps with compressors located in the outdoor unit, resistance heaters are usually used on or in the compressor crankcase to prevent liquid accumulation in the crankcase which can damage the compressor during start-up. The crankcase heaters usually run continuously such that their annual energy consumption seriously reduces overall heat pump efficiency. In accordance with the present invention, the compressor 10 is placed in the insulated enclosure 71 with the domestic water storage tank 20 to ensure that when the system is off and the domestic water temperature is maintained, the compressor remains warm and liquid refrigerant will not migrate to the compressor. An interlock thermostat can prevent system start up when the domestic water tank is too cold. Under those circumstances, the resistance tank heater 29 can then be used to preheat the tank to allow full system operation. The accumulator 13 is also located within the insulating enclosure 71.

The enclosure 71 separates the domestic hot water tank environment from the outer housing area. The heat exchange coils 44 are preferably located to the side of the enclosure 71, possibly as an open wall of the compartment 100. An outdoor fan 41 is placed at the top of the compartment and pulls outdoor air across heat exchange coils 44 for exhaust upward through the fan. Reversing valve 30, bypass valve 22, expansion valves 45 and other plumbing and refrigeration components are preferably located on the interior wall separating the space conditioning tank and the domestic tank. Preferably, the electrical components are located on a side wall 73. Access panels 72 are removable for adjustment and/or servicing of the various components.

E. Control System

A variety of control systems may be used to govern the three function heat pump system. For example, the unit will find applications in climates where both heating and cooling are required. Further, energy savings can be obtained in areas where electric utilities offer "time of day" rates. Such time of day rates require a higher charge for electricity during periods of peak use which generally correspond to times of warmest and coldest weather, and normal business hours. With the three function heat pump system in accordance with the presently claimed invention, the thermal storage allows electricity to be used by the heat pump during off peak hours. The building may extract heated or cooled water from the storage tank during peak hours for heating and cooling without substantial use of electricity.

In a preferred embodiment, the control system for the three function heat pump unit employs a microprocessor-based control system which is programmed to cause heat pump operation at the most favorable times with respect to outdoor conditions and utility rates. The control includes a time clock with a battery backup, temperature sensors for outdoor temperature, storage temperature, outdoor coil defrost and domestic water conditions, and a plug-in port for field diagnostics and reprogramming.

In operation, the compressor during winter operation extracts heat from an outdoor heat exchanger. The heat extracted plus the heat of compression is added to the two storage tanks. Under normal operation, the hot gas from the compressor will first deliver heat to the domestic water tank and then to the space conditioning tank. The refrigerant flow direction is reversed during summer conditions. Heat is extracted from the space conditioning tank to produce either chilled water or ice. The extracted heat is rejected to the domestic water tank and outdoor heat exchanger in series. If the water tank temperature is too low, the system can reverse to extract heat from the outdoor heat exchanger and supply it to the domestic water tank by bypassing the space conditioning. These operating modes are controlled by the control system to allow domestic water to be heated by the heat pump evenwhen there are no space heating or cooling loads. The control system with its storage and outdoor temperature sensors may advantageously operate to cause the heat pump to drive the space conditioning tank to higher temperatures when outdoor conditions are more favorable.

II. The Embodiment of FIG. 3

Figure 3:
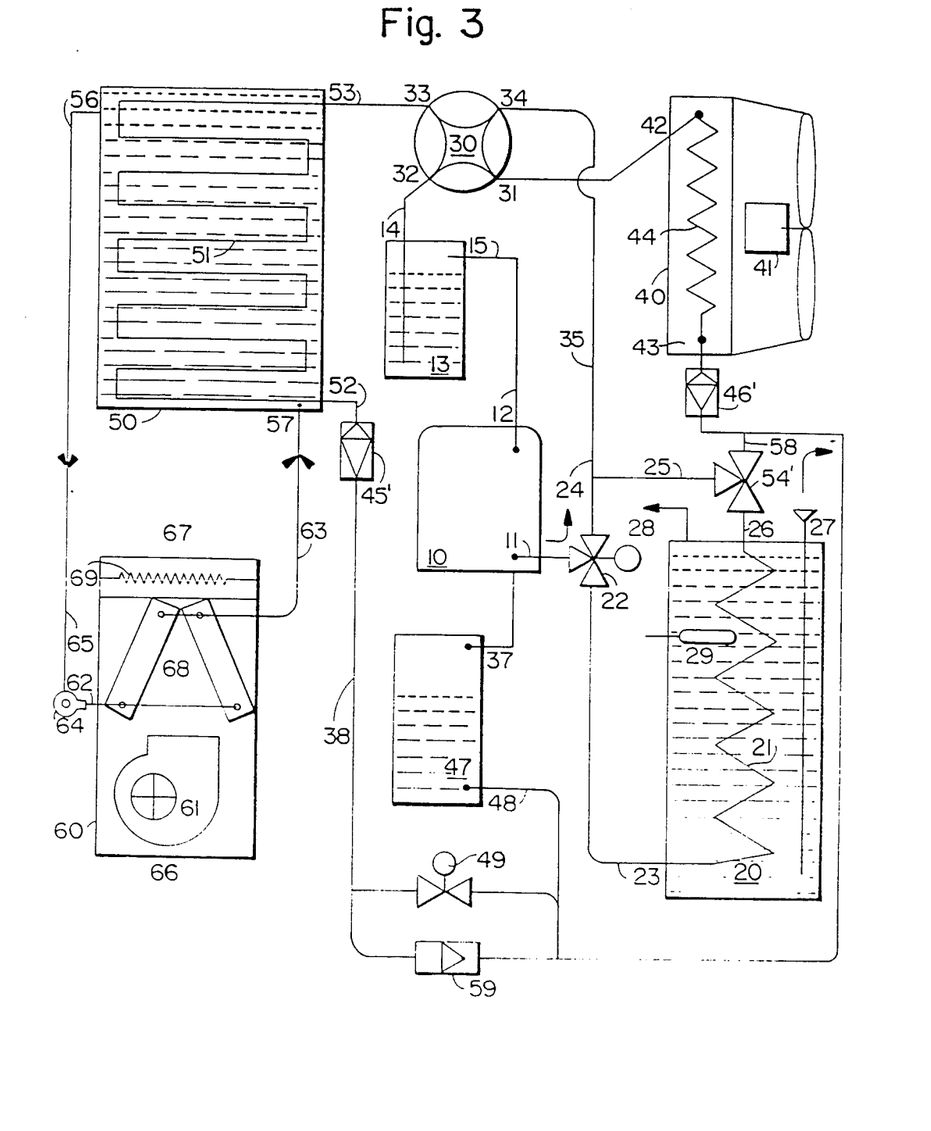
FIG. 3 is a schematic diagram of a second embodiment of the three function heat pump system in accordance with the present invention.

A second embodiment of the present invention is illustrated in FIG. 3. The reference numerals in FIG. 3 are identical to that of FIG. 1 for similar elements which will not be described in detail.

FIG. 3 illustrates a schematic of a three function heat pump system for advantageous use when the space conditioning tank contains ice during cooling operation. In addition, when the volume of refrigerant for the space conditioning tank far exceeds that of the outdoor heat exchanger, there may be a need for additional refrigerant during heating. The embodiment illustrated in FIG. 3 satisfies these concerns.

Similar to the embodiment of FIG. 1, the embodiment of FIG. 3 includes a compressor 10 with the outlet line 11 leading to the bypass valve 22. The bypass valve 22 either directs the refrigerant flow into the domestic water tank heat exchanger through line 23, or bypasses the domestic water tank 20 via bypass line 24. Both the bypass line 24 and the outlet 26 from the domestic heat exchanger 21 communicate with the common conduit 25.

A second bypass valve, or diverting valve 54' is located between the common conduit 25 and the outlet line 26. In both the heating and cooling modes, the refrigerant flow leaving the domestic water tank 20 passes through the diverter valve 54' to the common line 25. However, when hot water is required without space heating or cooling, the diverter valve 54' directs the refrigerant flow through a one way conduit 58 toward the outdoor heat exchanger 40 for return to the reversing valve 30 through the second selective conduit 31. The various operating modes for the second embodiment are described in detail herein.

A. Heating Mode

The heating mode is similar to that descibed in detail with respect to FIG. 1. From either the bypass line 24 or the common conduit 25 in FIG. 3, the refrigerant flow for heating enters a conduit 35 which directs the refrigerant to an inlet 34 of the reversing valve 30. The refrigerant is directed through the first selective conduit 33 to the heat exchanger 51 in the space conditioning tank 50. After transfering its heat to the medium within the tank, the refrigerant exits throuh line 52 and passes to a first biflow valve 45' without throttling. The refrigerant flow is directed by a reversible flow conduit 38 through a one-way check valve 59 to a second biflow valve 46'. The second biflow valve 46' throttles the refrigerant flow prior to its entry into the outdoor heat exchanger 40. After passing through the outdoor heat exchanger 40, the refrigerant flows through the reversing valve 30 to an inlet 14 for the accumulator 13. The refrigerant is then directed to the compressor 10 through a line 15 for eventual recirculation within the system.

A receiver 47 may be necessary to hold excess liquid refrigerant when either the large tank heat exchanger 51 or the outdoor heat exchanger coil 44 has substantially more interior volume than the other. If, for example, the heat exchanger 51 is designed to build ice in a cooling mode, it will consist of a large array of closely spaced tubes, with substantially more interior volume than the typical outdoor coil 44. Since the system condenser will typically contain more refrigerant than the evaporator, the system with ice-making cooling operation requires more refrigerant in winter for heating than in summer for cooling. The receiver 47 will accumulate excess refrigerant in the summer, and supply additional refrigerant in the winter.

The receiver 47 includes an inlet/outlet line 48 which communicates with the conduit 38, and an equalizer line 37 communicating with the compressor discharge line 11.

The first and second biflow valves 45', 46' allow the free flow of refrigerant in one direction while throttling the flow of refrigerant in the opposite direction. In the heating mode, the refrigerant leaving the space conditioning tank 50 freely flows in the first biflow valve 45' (as represented by the flow passing in the direction of the relatively large triangle in the first biflow valve 45'). Upon entering the second biflow valve 46', the refrigerant is throttled to reduce its pressure before entering the outdoor heat exchanger 40 (as represented by the flow passing in the direction of the relatively small triangle of the second biflow valve 46'). The biflow valves may be replaced by a one-way throttling device with a one-way check valve located in a parallel line. A capillary tube cannot be used to replace the two throttling devices because of the need for the inlet 48 from the liquid receiver 47 and the cooling valve 49 in the liquid line. These two components are required to control refrigerant flow as described below in more detail with regard to the cooling mode.

B. Cooling Mode

The cooling mode is similar to that described in detail above with reference to FIG. 1. With respect to FIG. 3, the flow from either the bypass line 24 or common line 25 enters the reversing valve 30 through the inlet 34 and is directed to the second selective conduit 31 for flow to the outdoor heat exchanger 40. Upon entering the outdoor heat exchanger 40, the refrigerant freely flows through the second biflow valve 46' into the reversible flow line 38 which leads to the space conditioning tank 50. If excess refrigerant is in the system, it may flow into the receiver 47 throuh the inlet line 48.

The refrigerant flow in the cooling mode cannot pass through the one-way check valve 59 and thus must flow through the cooling valve 49 which has a function which will be described in detail hereinafter. The refrigerant flow is throttled in the first biflow valve 45' prior to entry into the space conditioning valve 50. The refrigerant flows from the space heating tank via the first selective conduit 33 and returns to the reversing valve 30 for recirculation to the compressor 10.

When the system is deactivated and the space conditioning tank 50 contains ice, the refrigerant has a tendency to migrate towards the space conditioning tank. To prevent such migration, it most advantageous to provide locks which prevent migration of the refrigerant to the tank. In the system of FIG. 3, the one-way check valve 59 prevents the flow of refrigerant from the outdoor heat exchanger to the space conditioning tank. The flow must therefore pass through the cooling valve 49 which is open during the cooling mode. However, in the system deactivated state, the cooling valve 49 is closed to prevent migration of the refrigerant to the space conditioning tank via the line 38. The receiver 47 and inlet 48 are located downstream of the cooling valve 49 so that excess refrigerant in the receiver 47 does not flow to the space conditioning tank 50. Additional cooling valves may be located on the opposite side of the space conditioning heat exchanger 51 to prevent the migration of refrigerant through the inlet line 53. Alternatively, the reversing valve 30, bypass valve 22, and diverter valve 54' can be programmed to prevent flow from outdoor coil 40 when the system is deactivated.

C. Domestic Hot Water Heating Mode

As noted above, in both the heating and cooling modes, the refrigerant leaving the domestic water tank 20 passes through the diverter valve 54' to the common line 25 for direction towards the reversing valve 30. However, when hot water is required without space heating or cooling, the diverter valve 54' directs the refrigerant flow through the one-way conduit 58 to the outdoor heat exchanger 40. In this instance, the domestic water tank heat exchanger 21 functions as a system condenser. After exiting the outdoor heat exchanger, the refrigerant enters the reversing valve through the second selective conduit 31. The reversing valve 30 directs the refrigerant flow back to the accumulator 13 for eventual recirculation by the compressor 10.

The components in the embodiment of FIG. 3 are preferably arranged in a similar manner as that described above with reference to FIG. 2. In particular, the compressor 10 is placed in an insulated enclosure with the domestic water storage tank 20 to insure that when the system is deactivated and the domestic water temperature is maintained, the compressor remains warm and liquid refrigerant will not migrate toward the compressor. The arrangement of components therefore eliminates the need for crankcase heaters.

The control system for the embodiment of FIG. 3 is similar to that described above with reference to FIG. 1.

Although the three function heat pump of the present invention has been described in connection with the preferred embodiment thereof, it will be appreciated by those skilled in the art that additions, modifications, substitutions and deletions not specifically described may be made without departing from the spirit and scope of the invention defined in the appended claims.

For example, the bypass valves 22 and 54 may each be replaced by a pair of two way valves if desired. Other changes are also possible.

The principals, preferred embodiments and modes of operation of the present invention have been described in the foregoing specification. The invention which is intended to be protected herein, however, is not to be construed as limited to the particular forms disclosed, since these are to be regarded as illustrative rather than restrictive. Various changes may be made by those skilled in the art without departing from the spirit of the invention.

What is claimed is:

1. A three function heat pump system for providing a heating mode, a cooling mode, and a hot water production mode irrespective of said heating and cooling modes, said system comprising:

compressor means for compressing refrigerant, reversible flow refrigerant conduit means for providing series communication among a first heat exchanger located within a medium contained in a first storage tank, throttle means for reducing the pressure of said refrigerant, and an external heat exchanger;

reversing valve means for selectively determining the direction of flow in said reversible flow conduit means in response to a desired heating or cooling mode, said reversing valve means in a heating mode directing refrigerant flow in a first direction to said first heat exchanger to condense said refrigerant prior to directing said refrigerant through said throttle means to said external heat exchanger to evaporate said refrigerant, said reversing valve means in a cooling mode directing refrigerant flow in a second direction opposite to said first direction to said external heat exchanger to condense said refrigerant prior to directing said refrigerant through said throttle means to said first heat exchanger to evaporate said refrigerant; and dual condenser means for producing hot water irrespective of said heating and cooling modes, said dual condenser means including a second heat exchanger associated with a second storage tank containing water and having bypass valve means for selectively bypassing said first heat exchanger, said dual condenser means providing series communication between said second heat exchanger and said first heat exchanger when hot water is desired with said heating and cooling modes and bypassing said first heat exchanger when hot water is desired without heating and cooling modes, said second heat exchanger functioning as a condenser for said system.

2. The system of claim 1, wherein said compressor means and said second storage tank are located within a thermally insulated compartment separate from said first storage tank.

3. The system of claim 1 further comprising means for circulating the medium contained in the first storage tank to an indoor heating and cooling distribution means, said circulating means and said indoor distribution means operating independently of the compressor means, such that the medium in the first storage tank can be heated or cooled by operation of the compressor means in the heating or cooling mode during a first time period and the medium can be circulated to the indoor distribution means during a later, second time period to provide heating or cooling of an indoor space without operation of the compressor means.

4. A three function heat pump system for providing heating, cooling and hot water to an internal environment separate from an external environment, said system comprising:

compressor means for compressing a refrigerant into a high pressure, high temperature refrigerant;

a reversible flow refrigerant conduit means for providing series communication between a first heat exchanger located within a medium contained in a first reservoir and an external environment heat exchanger, throttle means being located between said first heat exchanger and said external environment heat exchanger for reducing the pressure of the refrigerant, an internal heat exchanger being associated with said medium in said first reservoir for exchanging heat with said internal environment;

a reversing valve means for directing refrigerant flow from said compressor means through a second conduit to said reversible flow conduit, and for selectively determining the direction of flow in said reversible flow conduit means in response to a desired heating or cooling mode, (a) said reversing valve in a heating mode directing refrigerant flow in a first direction to said first heat exchanger to condense said refrigerant and transfer heat to said medium in said first reservoir prior to directing said condensed refrigerant through said throttle means to said external environment heat exchanger to evaporate the refrigerant, the refrigerant returning to the compressor for recirculation, (b) said reversing valve in a cooling mode directing refrigerant flow in a second opposite direction to said external environment heat exchanger to condense said refrigerant and transfer heat to said external environment prior to directing said condensed refrigerant through said throttle means to said first heat exchanger to evaporate said refrigerant and absorb heat from said medium in the first reservoir, the refrigerant returning to said compressor means for recirculation; and hot water production means for heating water in a second reservoir communicating with said internal environment, said hot water production means including:

a second heat exchanger associated with said second reservoir and communicating with said second conduit between said compressor means and said reversing valve means; and bypass valve means for selectively bypassing said first heat exchanger, said hot water production means heating the water within said second reservoir irrespective of said heating and cooling modes by directing refrigerant flow through said second heat exchanger to condense said refrigerant, said bypass valve means directing said condensed refrigerant to selectively bypass said first heat exchanger and flow directly through said throttle means and said external environment heat exchanger to evaporate said refrigerant, said second reservoir being relatively smaller than said first reservoir and said second heat exchanger having a size sufficient to function as a condenser for said system.

5. The system of claim 2, wherein said bypass valve means further includes means for bypassing said second heat exchanger in response to a temperature sensed in said second reservoir, said means for bypassing said second heat exchanger causing said refrigerant flow to bypass said second heat exchanger provided said temperature in said second reservoir is greater than a maximum desired temperature.

6. The system of claim 2 further comprising receiver means for containing excess refrigerant for the cooling mode and supplying excess refrigerant for the heating mode, said receiver means being in communication with said reversible flow conduit means between said first heat exchanger and said external environment heat exchanger.

7. The system of claim 2 further comprising valve means in said reversible flow conduit means for preventing migration of refrigerant toward said first reservoir when the compressor is idle.

8. The system of claim 6, further comprising cooling valve means in said reversible flow conduit means for preventing migration of refrigerant toward said first heat exchanger.

9. The system of claim 8 wherein said receiver means is located in said reversible flow conduit means on the external environment heat exchanger side of said cooling valve means.

10. A method of providing space heating, space cooling and hot water in a reversible heat pump system, said method comprising the steps of:

compressing a refrigerant in a compressor, providing series communication for said refrigerant to flow among the compressor, a first heat exchanger, a throttle device, and an external heat exchanger, said first heat exchanger being located within a medium in a first reservoir for providing thermal storage, causing said refrigerant to flow in a first direction for space heating and in an opposite second direction for space cooling, the refrigerant flowing in said first direction for space heating condensing in said first heat exchanger prior to flowing through said throttle device for reducing the pressure of the refrigerant, said refrigerant subsequently evaporating in said external heat exchanger to provide space heating, said refrigerant flowing in the second direction for spacing cooling condensing in said external heat exchanger prior to flowing through said throttle device, said refrigerant subsequently evaporating in said first heat exchanger to provide space cooling, providing a second heat exchanger for producing hot water and locating said second heat exchanger in series communication with said first heat exchanger to provide hot water in said heating and cooling modes by directing refrigerant flow through said second heat exchanger prior to said first heat exchanger, said second heat exchanger being located within water in a second reservoir for providing thermal storage, and selectively bypassing said first heat exchanger to produce hot water irrespective of said heating and cooling modes, the bypassing of said first heat exchanger including directing refrigerant flow through said second heat exchanger to condense said refrigerant, bypassing said first heat exchanger, and causing said refrigerant to flow directly through said throttle means and said external heat exchanger to evaporate said refrigerant.

11. The method of claim 10 further comprising the step of providing an internal environment heating and cooling means including an internal heat exchanger and circulating means for circulating said medium in said first reservoir through said internal heat exchanger, said internal environment heating and cooling means selectively supplying heating and cooling to an internal environment independently of the operation compressor.

12. A three function heat pump system for providing heating, cooling and hot water to an internal environment separate from an external environment, said system comprising:

compressor means for compressing a refrigerant;

a reversible flow refrigerant conduit means for providing series communication among a first heat exchanger located within a medium contained in a first storage tank, throttle means for reducing the pressure of said refrigerant, and an external heat exchanger;

reversing valve means for selectively determining the direction of flow in said reversible flow conduit means in response to a desired heating or cooling mode, said reversing valve means in a heating mode directing refrigerant flow in a first direction to said first heat exchanger to condense said refrigerant and to heat said medium in said first storage tank prior to directing said refrigerant through said throttle means to said external heat exchanger to evaporate said refrigerant, said reversing valve means in a cooling mode directing refrigerant flow in a second direction opposite to said first direction to said external heat exchanger to condense said refrigerant prior to directing said refrigerant through said throttle means to said first heat exchanger to evaporate said refrigerant and to cool said medium in said first storage tank;

hot water production means including a second storage tank containing water, a second heat exchanger associated with said second storage tank and communicating with said second conduit between said compressor means and said reversing valve means, and bypass valve means for selectively bypassing said first heat exchanger, said hot water production means heating the water within said second storage tank irrespective of said heating and cooling modes by directing refrigerant flow through said second heat exchanger to condense said refrigerant, said bypass valve means directing said condensed refrigerant to selectively bypass said first heat exchanger and flow directly through said throttle means and said external heat exchanger to evaporate said refrigerant; and internal environment heating and cooling means including an internal heat exchanger for exchanging heat with said internal environment and circulating means for circulating said medium in said first storage tank through said internal heat exchanger, said internal environment heating and cooling means operating independently of the compressor means such that said medium in said first storage tank can be heated or cooled by operation of the compressor means in the heating or cooling mode during a first time period and said medium can be circulated to the internal heat exchanger during a later, second time period to provide heating or cooling of said internal environment without operation of the compressor means.

13. A method of providing space heating, space cooling and hot water to an internal environment in a reversible heat pump system, said method comprising the steps of:

compressing a refrigerant in a compressor;

providing series communication for said refrigerant to flow among the compressor, a first heat exchanger located within a medium in a first storage tank, a throttle device, and an external heat exchanger;

causing said refrigerant to flow in a first direction for heating and in an opposite second direction for cooling, the refrigerant flowing in said first direction for heating condensing in said first heat exchanger and heating the medium in said first storage tank prior to flowing through said throttle device for reducing the pressure of the refrigerant, said refrigerant subsequently evaporating in said external heat exchanger, said refrigerant flowing in the second direction for cooling condensing in said external heat exchanger prior to flowing through said throttle device, said refrigerant subsequently evaporating in said first heat exchanger and cooling the medium in said first storage tank;

providing internal environment heating and cooling means including an internal heat exchanger associated with said medium in said first storage tank and circulating means for circulating said medium in said first storage tank through said internal heat exchanger;

selectively operating said circulating means to provide heating and cooling of the internal environment irrespective of the operation of the compressor;

providing a second heat exchanger for producing hot water and locating said second heat exchanger in series communication with said first heat exchanger to provide hot water in said heating and cooling modes by directing refrigerant flow through said second heat exchanger prior to said first heat exchanger, said second heat exchanger being located within a second storage tank containing water; and selectively bypassing said first heat exchanger to produce hot water irrespective of said heating and cooling modes, the bypassing of said first heat exchanger including directing refrigerant flow through said second heat exchanger to condense said refrigerant, bypassing said first heat exchanger, and causing said refrigerant to flow directly through said throttle means and said external heat exchanger to evaporate said refrigerant.

* * * * *